R. CAUDRON.
ARRANGEMENT OF FLEXIBLE MEMBERS.
APPLICATION FILED APR. 30, 1919.
1,350,986. Patented Aug. 24, 1920.
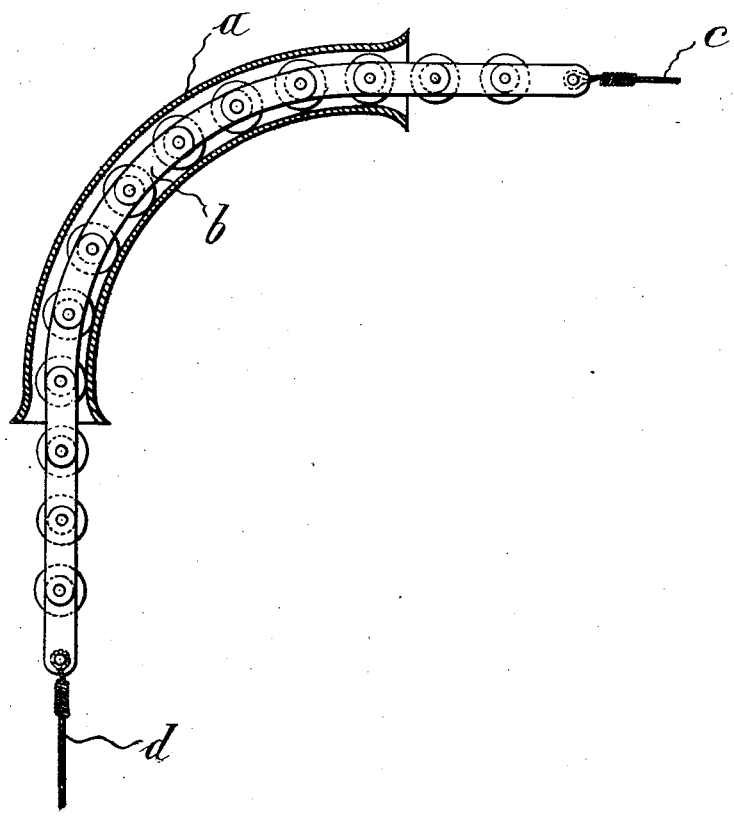

UNITED STATES PATENT OFFICE.

RENÉ CAUDRON, OF ISSY-LES-MOULINEAUX, FRANCE.

ARRANGEMENT OF FLEXIBLE MEMBERS.

1,350,986.  Specification of Letters Patent.  Patented Aug. 24, 1920.

Application filed April 30, 1919. Serial No. 293,780.

*To all whom it may concern:*

Be it known that I, RENÉ CAUDRON, manufacturer, citizen of the French Republic, residing at Issy-les-Moulineaux, Department of Seine, France, have invented certain new and useful Improvements in Arrangements of Flexible Members; and I do hereby declare the following to be a full, clear, and exact description of the invention, such as will enable others skilled in the art to which it appertains to make and use the same.

This invention relates to the arrangement of flexible members, such as wires, cables or the like for use in controlling mechanism or for the transmission of movement and it has for its object to improve the function of the mechanism in which such members are chiefly employed.

To this end provision is made according to this invention at the point or points where a wire, cable or the like used for controlling purposes or for transmission is to operate with a turn or over a bend, in addition to a rigid guide tube of a flexible roller chain preferably in the phase of or combined with the portion or portions of the transmission wire, cable or the like which are to be guided in the interior of the guide tube as will be clearly understood from the description of the annexed drawing showing one form of the invention by way of example.

Arranged as usual at the place where the transmission wire or cable is to be given a turn or operate over a bend, is a rigid guide tube *a* of the requisite shape. The wire or cable, however, instead of passing through the guide tube *a*, freely as hitherto, is provided with or at this portion, replaced by a link chain *b*, with rollers of a diameter such that the chain cannot come into contact with the internal walls of the tube, except by means of the said rollers.

Attached, as shown, to the extremities of this chain are the wires or wire sections *c* and *d* connected respectively to the controlling members and the members to be controlled.

This arrangement has all the advantages of simplicity, lightness, facility of handling, and mounting present in wire or cable transmissions, but besides offering the advantage of avoiding any appreciable friction in the interior of the guide tube *a*, which not only reduces the resistance, but also the wear to a minimum. The only friction produced, in fact, is the friction of the rollers on their axes, which is negligible.

An arrangement of this kind is useful in all cases where transmission of movement is desirable over a turn or angularly, provided there is no change in the actual plane of the bend. It may, with advantage, be employed in the pull controls of flying machines or in the place of other arrangements hitherto used for similar purposes.

What I claim and desire to secure by Letters Patent is:—

1. In a flexible motion transmitting mechanism the combination of a rigid curved tube, a link chain passing through said tube for joining two sections of a flexible control member, and rollers mounted on the link pins of said chain and protruding beyond the sides of the chain so as to prevent the links of the chain from coming into frictional contact with said tube.

2. In a flexible motion transmitting mechanism the combination of a rigid curved tube having its axis located in a single plane, a flexible operating member having spaced controlling and controlled sections, a link chain interposed between said sections and passing through said tube, and rollers mounted on said links adapted to contact with said tube so as to substitute rolling friction for the sliding friction of said links.

In testimony whereof I have hereunto set my hand in presence of a witness.

RENÉ CAUDRON.

Witness:
  EUGENE TULLIE.